United States Patent Office 3,586,720
Patented June 22, 1971

3,586,720
METHOD FOR THE CATALYTIC DEHYDROGENATION OF CYCLODODECANOL IN THE LIQUID PHASE
Wilhelm Knepper, Manfred zur Hausen, and Gunter Hockele, Marl, Germany, assignors to Chemische Werke Huls Aktiengesellschaft, Marl, Kreis Recklinghausen, Germany
No Drawing. Filed Jan. 13, 1967, Ser. No. 608,982
Claims priority, application Germany, Feb. 4, 1966, C 38,121
Int. Cl. C07c 45/00, 35/02, 5/02
U.S. Cl. 260—586                                     2 Claims

ABSTRACT OF THE DISCLOSURE

A carrier catalyst composition for use in dehydrogenating cyclododecanol, in the liquid phase, at a temperature of from about 180° C. to 271° C., consists essentially of copper on, as carrier, either active aluminum oxide or highly dispersed silicic acid, which carrier had had, after drying at 120° C., a loss on ignition of from 1 to 10% by weight, the amount of copper contained therein and thereon being from 5 to 10 parts by weight of copper per one part by weight of said loss of ignition, which composition had been calcined at a temperature of 600–1100° C.

---

Application Ser. No. 460,815 filed June 2, 1965 in the name of Manfred zur Hausen of 4370 Marl, Germany, and Wilhelm Knepper of 4370 Marl, Germany (now Pat. No. 3,374,270) describes the liquid phase dehydrogenation of cyclododecanol with a copper catalyst consisting of 5 to 15% by weight of copper supported on a molded active aluminum oxide carrier.

The useful life of this catalyst is dependent on its relatively low copper content. Furthermore, at dehydrogenation temperatures in excess of 230° C., which are desirable for the purpose of increasing the reaction rate and the space-time yield, a dehydration action of the aluminum oxide will occur, thus causing a lowering of the yield of dodecanone.

An increase in the copper content, which is limited primarily by the pore and surface size of the aluminum oxide, cannot be attained even if the carrier is impregnated repeatedly by the proper cupric salt solutions. Copper deposited at the outer surface of the carrier lacks sufficient adhesion and will rub off easily after the thermal treatment.

Carrier catalysts with a silica gel base will have a strong dehydration effect on cyclododecanol as soon as the temperature exceeds 210° C., and are even less advantageous than aluminum oxide carriers.

It was found that cyclododecanol can be dehydrogenated in the liquid phase in the presence of a copper catalyst at higher temperatures and without significant side-reactions if the catalyst contains, as carrier, active aluminum oxide or highly dispersed silicic acid which after drying at 120° C. still has a loss on ignition of 1 to 10 percent by weight and if the copper content of the catalyst amounts to 5 to 20 parts by weight per part by weight of this loss on ignition.

Such catalysts can be manufactured most advantageously by preparing a dry mixture of the carrier dried at 120° C., and a thermally decomposable copper compound such as basic copper carbonate, copper hydroxide or copper oxide, and forming a paste thereof by mixing it with an aqueous solution of an amine, or with a copper-amine-complex solution of an amine which can form complex salts with copper compounds and which will decompose only at temperatures above 150° C. This paste is then processed in usual manner into molded bodies which are dried and then calcined at temperatures ranging from 600 to 1100° C.

Suitable amines which form complexes with cupric salts which are decomposable only at temperatures above 150° C. are for example ethylenediamine and ethanolamine.

The composition of the catalysts can be varied in that chromium can be added thereto in quantities of up to 5 percent by weight, relative to the usable catalyst.

If the above described catalysts are employed, the dehydrogenation can be carried out at temperatures near the boiling point of the cyclododecanol (271° C.) with high yields per units of time in comparison with other catalysts and with an almost quantitative conversion. The occurrence of by-products is negligible.

EXAMPLE 1

25 kg. of finely divided silicic acid with a loss on drying of 4.5% and a loss on ignition of 5.8% was mixed thoroughly with 20 kg. of finely divided basic copper carbonate (55.5% Cu) to form a powder mixture. Thereupon a solution of 1.1 kg. of chromic acid, dissolved in 4 liters of water, was sprayed onto the powder with stirring.

The powder, after being treated with chromic acid solution, was combined in a mixer with 28.6 kg. of an aqueous ethylenediamine solution which contained 30 percent by weight of ethylenediamine. The mass so prepared was pressed into molded bodies in a granulator. The molded articles were dried for 16 hours in a current of air at temperatures between 100 and 110° C., and then treated for 10 hours in a current of gas consisting of 75% of water vapor and 25% of air at temperatures ranging from 400 to 650° C. and finally calcined in a current of air at 600 to 1000° C.

500 ml. of the catalyst so prepared was placed in a reactor, operated as a bottoms reactor and loaded hourly with 1000 ml. of cyclododecanol. During heating the catalyst was reduced at a temperature of 180° C. to 200° C. After termination of the reduction the temperature was increased to 220° C. The dehydrogenation discharge contained, in addition to the non-converted cyclododecanol, 85.3% of cyclododecanone and 0.36% of cyclododecene.

When the temperature was increased to 230° C. the yield was 88.2% of cyclododecanone and .17% of cyclododecene. At 235° C. the dehydrogenation discharge contained 90.2% of cyclododecanone and .14% of cyclododecene and at 245° C. 92.3% of cyclododecanone and .26% of cyclododecene.

At an hourly through-put of 500 ml. of cyclododecanol and at a temperature of 250° C. the dehydrogenation discharge was composed of 96.7% of cyclododecanone, 3.1% of cyclododecanol and .2% of cyclododecene.

A further test showed that over a period of 95 days 1530 kg. of cyclododecanol could be passed over 500 ml.=425 g. of the above described catalyst, producing 1250 kg. of cyclododecanone. Catalyst consumption, relative to the cyclododecanone, was 0.034%.

EXAMPLE 2

1000 g. of highly dispersed aluminum oxide with a loss on ignition of 8.5% was mixed thoroughly with 820 g. of a basic copper carbonate (55.5% of Cu). Thereupon, 45 g. of a solution of chromic acid, in 100 ml. of water, was sprayed onto the dry powder with stirring. The powder, after being treated with the chromic acid solution, was combined in a mixer with 750 g. of an aqueous ethylenediamine solution which contained 42 percent by weight of ethylenediamine and then pressed into molded articles. The molded articles were dried for 16 hours in current of air at approximately 110° C., for 10 hours in a current of gas consisting of 75 percent by volume of water vapor and 25 percent by volume of air heated to temperatures ranging from 400° C. to 550° C., and finally subjected to calcining in a current of pure air at 600° C.

200 ml. of the catalyst so prepared was contacted with 250 ml. of cyclododecanol hourly and at a temperature of 230° C. The dehydrogenation yield contained, in addition to non-converted cyclododecanol, .5% of cyclododecene and 86.3% of cyclododecanone.

We claim:

1. Method for the dehydrogenation of cyclododecanol which comprises contacting the cyclododecanol in the liquid phase with a copper catalyst composition at a temperature of from at least 230° C. to 271° C., said copper catalyst consisting essentially of a carrier material selected from the group consisting of active aluminum oxide and highly dispersed silicic acid which after drying at 120° C. has a loss on ignition of 1 to 10% by weight and 5 to 20 parts by weight of copper per part by weight of said loss on ignition, said catalyst composition having been calcined at a temperature of from 600 to 1100° C.

2. Method according to claim 1, in which the catalyst has been produced by a process which comprises forming a dry mixture of a carrier selected from the group consisting of (a) active aluminum oxide and highly dispersed silicic acid which after drying at 120° C. has a loss on ignition of 1 to 10% by weight with (b) a thermally decomposable copper compound in quantity sufficient to supply 5–20 parts by weight of copper per part by weight of said loss on ignition; moistening the resulting dry mixture with an aqueous solution of a member selected from the group consisting of amines and copper-amine complexes that form with said copper compound complex salts that decompose only at temperatures above 150° C.; molding the resulting paste and drying and calcining the molded product at a temperature of from 600 to 1100° C.

References Cited

UNITED STATES PATENTS 3,374,270   3/1968   Zur Hausen _____ 260—586

FOREIGN PATENTS 318,124   8/1929   Great Britain _____ 260—596

OTHER REFERENCES

Collier: "Catalysis in Practice," pp. 54 to 62 (1957).

BERNARD HELFIN, Primary Examiner

N. P. MORGENSTERN, Assistant Examiner

U.S. Cl. X.R.

252—454, 476; 260—666